United States Patent
Sloan

(10) Patent No.: US 7,560,128 B2
(45) Date of Patent: Jul. 14, 2009

(54) PROCESS FOR PREPARING REDUCED FAT FROZEN POTATO STRIPS

(75) Inventor: Jerry L. Sloan, Richland, WA (US)

(73) Assignee: ConAgra Foods Lamb Weston, Inc., Kennewick, WA (US)

( * ) Notice: Subject to any disclaimer, the term of this patent is extended or adjusted under 35 U.S.C. 154(b) by 886 days.

(21) Appl. No.: 11/053,031

(22) Filed: Feb. 7, 2005

(65) Prior Publication Data
US 2006/0177544 A1 Aug. 10, 2006

(51) Int. Cl.
A23L 1/216 (2006.01)

(52) U.S. Cl. .................. 426/250; 426/637; 426/441

(58) Field of Classification Search ................. 426/250, 426/637, 438, 441
See application file for complete search history.

(56) References Cited

U.S. PATENT DOCUMENTS

| | | |
|---|---|---|
| 3,244,538 A | 4/1966 | Kaehler |
| 4,068,572 A | 1/1978 | Vogt |
| 4,167,588 A * | 9/1979 | Willard ............ 426/283 |
| 4,366,749 A | 1/1983 | Caridis et al. |
| 4,632,838 A | 12/1986 | Doenges |
| 4,721,625 A | 1/1988 | Lee et al. |
| 4,876,102 A | 10/1989 | Feeney et al. |
| 4,886,659 A * | 12/1989 | Baines et al. ............ 424/63 |
| 4,900,576 A * | 2/1990 | Bonnett et al. ............ 426/438 |
| 4,923,705 A | 5/1990 | Mottur et al. |
| 4,933,194 A | 6/1990 | Barry et al. |
| 4,933,199 A | 6/1990 | Neel et al. |
| 4,978,542 A | 12/1990 | Buckley |
| 5,059,435 A | 10/1991 | Sloan et al. |
| 5,084,291 A | 1/1992 | Burrows et al. |
| 5,141,759 A | 8/1992 | Sloan et al. |
| 5,188,859 A | 2/1993 | Lodge et al. |
| 5,312,631 A | 5/1994 | Yamashita |
| 5,370,898 A | 12/1994 | Zussman |
| 5,372,830 A | 12/1994 | Muller |
| 5,393,544 A * | 2/1995 | Hannah et al. ............ 426/250 |
| 5,690,982 A | 11/1997 | Fazzolare et al. |
| 5,753,291 A | 5/1998 | Pederson et al. |
| 5,816,138 A | 10/1998 | Benson et al. |
| 5,846,589 A | 12/1998 | Baker et al. |
| 5,858,431 A | 1/1999 | Wiedersatz |
| 5,891,494 A | 4/1999 | Badertscher |
| 6,036,987 A | 3/2000 | Fukuyama |
| 6,113,957 A * | 9/2000 | Mattinson et al. ............ 426/250 |
| 6,136,358 A | 10/2000 | Minelli et al. |
| 6,312,747 B1 | 11/2001 | Villagran et al. |
| 6,389,958 B1 | 5/2002 | Ono |
| 6,461,663 B1 | 10/2002 | Martines-Serna Villagran et al. |
| 6,468,573 B1 | 10/2002 | Herrick et al. |
| 6,514,554 B1 | 2/2003 | Minelli et al. |
| 6,544,580 B1 | 4/2003 | Martines-Serna Villagran et al. |
| 6,548,093 B1 | 4/2003 | Collinge et al. |
| 6,555,791 B2 | 4/2003 | Lubrina et al. |
| H2091 H | 12/2003 | Scavone et al. |

FOREIGN PATENT DOCUMENTS

JP 359120079 A 7/1984
WO WO 2004/082400 A1 9/2004

OTHER PUBLICATIONS

Cenkowski, "Superheated-Steam Dehydration: Making a Better Noodle," University of Manitoba, Faculty of Agricultural & Food Sciences, 3pp. (Oct. 9, 2003).

Moreira et al., "Deep Fat Frying: Fundamentals and Applications," Deep-Fat Frying, Oils, and Snack Technology from C.H.I.P.S., http://www.chipsbooks.com/deepfat.htm, 2pp., printed May 12, 2005.

Morley, "Airless Drying and Superheated Steam The Next Generation of Rendering?," Render Magazine, 4pp. (Jun. 2003), http://www.rendermagazine.com/June2003/AirlessDrying.html, 4pp., printed May 27, 2004.

Tang et al., "Dehydration Dynamics of Potatoes in Superheated Steam and Hot Air," Canadian Agricultural Engineering, 42(1):6.1-6.13 (Jan./Feb./Mar. 2000).

* cited by examiner

*Primary Examiner*—Carolyn A Paden
(74) *Attorney, Agent, or Firm*—Klarquist Sparkman, LLP

(57) ABSTRACT

A method of preparing potato strips includes cutting potatoes into strips, blanching the strips, dipping the strips in an aqueous solution containing salt, color additives, SAPP or other additives, and drying the strips. The dry strips are parfried, partially deoiled, washed in water, cooled, exposed to superheated steam, dried in an impingement oven, cooled and frozen. The strips, before parfrying, may be coated with a batter. The frozen strips may be reconstituted by heating in an oven. In alternative methods, frozen strips are prepared with no or virtually no fat content.

34 Claims, No Drawings

PROCESS FOR PREPARING REDUCED FAT FROZEN POTATO STRIPS

The present invention relates generally to food processing, and more particularly to a process for preparing reduced fat frozen french fried potatoes, no fat frozen potatoes and the like.

BACKGROUND OF THE INVENTION

Parfried and frozen potato products are widely available and used in both the food service markets and consumer markets. Because the worldwide demand for these products in the food service industry alone is so large, parfried and frozen potatoes have become very important products to the food processing industry generally, and to the potato processing industry in particular. Indeed, entire industries and markets have developed around these products alone. As such, there is a constant demand not only for new products, but also for improved processing methods to make the products.

One of the most common frozen potato products now available is the popular french-fry potato strip, commonly called the "french fry." In addition to traditional straight-cut french fries, parfried and frozen potato products are available in a wide variety of different cut shapes and forms, such as helical fries and waffle-cut fries. There are also various flavored products, battered products and the like.

Within the food service industry, particularly in the fast food segment, most french fries are prepared at the restaurant by "finish frying" the frozen potato strips in hot oil. The quality of finished french fries sold to consumers is affected not only by the finish frying step at the restaurant, but also is greatly affected by the processing method used to make the frozen strips. Common to most known processes for making french fries is the desire to produce a product that meets the needs of restaurants, food service providers and consumers.

Lower fat content is sought by many consumers, particularly those interested in monitoring and controlling their consumption of fats. It therefore has become desirable, partly for health reasons, for potato processors to offer as one option a french fry having a reduced fat content.

It is therefore one object of the present invention to provide a process for preparing frozen potato products having a reduced fat content that, upon reconstitution, exhibit desirable attributes regardless of the manner of reconstitution.

A further object of this invention is to provide a processing method for preparing frozen potato products having a reduced fat content which, upon reconstitution, exhibit desirable flavor, texture and appearance characteristics.

Yet another object of this invention is to provide a reduced fat potato product and process for preparing same, that exhibits desirable flavor, texture and appearance characteristics when reconstituted by baking.

Another object is to provide a no-fat potato product and process for preparing the same, that exhibits acceptable flavor, texture and appearance characteristics.

Other objects and advantages of the invention will become apparent from the following detailed description of the invention.

SUMMARY OF THE INVENTION

In brief summary, the present invention comprises a process for preparing potato strips and the like. In one embodiment, whole potatoes are cut into strips, blanched, and contacted with a solution containing one or more additives including, for example, a coloring agent, SAPP, salt, dextrose, flavorings, seasonings and/or starches. The strips then may be blanched in steam and/or air dried, preferably at a temperature and for a time sufficient to cause a weight loss of about 5 to 15%. The strips thereafter may be allowed to equilibrate (at least partially) by exposing them briefly to steam or for a longer time to ambient air. The equilibrated strips may be coated with a batter including, for example, one or more food starches, flour, seasonings, leavening and/or dextrin, or processed further without a batter coating.

The strips thereafter are parfried or at least exposed to oil, preferably either by immersing the strips in an oil bath or spraying the strips with oil to impart an oil content to the strips. The oil treated strips may be deoiled and rinsed with hot water, and then cooled in air to facilitate retrograding, preferably in a flow of moving air. The strips are cooked and dehydrated by exposing them to superheated steam, preferably at a temperature of about 300° F. to 500° F., and thereafter preferably dried in an impingement oven. The strips may be dried in the impingement oven at a temperature of about 400° to 500° F. for about one to four minutes and thereafter cooled. The strips are frozen for shipment and handling and later reconstituted, typically by heating in a convection, microwave or other oven. The finished fries have a relatively low oil content compared to traditional french fries and yet exhibit flavor, texture and appearance characteristics similar to traditional finish fried french fries.

In another "no-fat" embodiment, whole potatoes are baked at a temperature and for a period of time sufficient to raise the core temperature of the potatoes preferably to about 180° F., cooled (preferably in cool air at about 40° F. for about 2 to 4 hours) and cut into strips. The cut strips preferably are contacted with a solution containing one or more additives as described above and exposed to steam, preferably for about 1 to 5 minutes. The strips thereafter are treated with superheated steam, preferably at about 375° F. to 475° F. for about 1 to 3 minutes, and frozen. The frozen strips may be reconstituted by heating in a conventional, convection, high velocity impingement, microwave or other oven. Other reconstitution methods may be used depending on the preparer's desired objectives. The resulting product is tasteful and exhibits at least some of the characteristics of traditional french fries. In one alternative embodiment, the cut strips may be blanched, dried, treated with superheated steam and frozen, without the initial baking/cooling steps.

In another embodiment, the frozen strips may be reconstituted by heating with superheated steam or a combination of superheated steam and hot air.

DETAILED DESCRIPTION OF A PREFERRED EMBODIMENT

In accordance with the present invention, raw potatoes, preferably of the Russet-Burbank, Ranger Russet, Shepody, or Alturas, variety, are cleaned, peeled, trimmed and inspected for defects. The washing and peeling steps are performed according to conventional techniques. Typically the potatoes are cleaned using a water flume or spray, or a combination of both. The raw potatoes may be peeled with the aid of steam as, for example, by subjecting the potatoes to steam at about 200 psi for about 10 to 15 seconds.

While one embodiment disclosed herein includes the step of peeling the potatoes, that step may be eliminated from the process if an unpeeled product is desired. After washing and sorting, the peeled potatoes optionally are preheated in a conventional manner, preferably in hot water that is maintained at a temperature of about 125° F. to 145° F. for about 30 minutes. Preheating in water can be accomplished in any number of known manners, but preferably is done either by conveying the potatoes through a heated water bath or by spraying the potatoes with heated water as the potatoes are conveyed past the sprayers. During the preheating step, if this step is used, most of the potato tissue is heated uniformly to approximately the temperature of the water.

An alternative preheating method is to preheat the potatoes in warm air. If the preheating is done in air, it can be carried out in a number of conventional manners, and preferably is done in a heating tunnel as the potatoes are conveyed through the tunnel. Preheating the potatoes in air typically involves holding the potatoes in heated air at a temperature up to 135° F. for about 30 minutes, with countercurrent airflow. As with preheating in water, the potatoes preferably are heated thoroughly throughout. The preheating step helps precondition the potatoes for more efficient and effective cutting.

After the preheating step, the potatoes are cut into sections suitably sized for french fried potato strips. The cutting itself is done according to well-known methods. In one embodiment, the strips have a cross-sectional dimension in the range of about 0.18 inch by 0.18 inch to 0.75 inch by 0.75 inch, with a preferred cross-sectional dimension range of about 0.25 inch by 0.25 inch to 0.5 inch by 0.5 inch, although other cut sizes are equally applicable to this process. The process described herein also is equally applicable to other cuts in addition to traditional straight cuts, for instance, helical strips, spiral strips, "crinkle cut" strips, "concertina cut" strips, waffle cuts and many other shapes. Thus, as used herein, the term "strips" refers to any of these and other cut shapes to which the process may apply.

The potato strips then are blanched either by immersing the strips in hot water or exposing the strips to steam. If the strips are blanched in hot water, they preferably are immersed in water held at a temperature of about 150° F. to 200° F. for a period of about 4 to 20 minutes. Most preferably, the strips are immersed in water having a temperature of about 160° F. to 175° F. for about 6 to 10 minutes. The blanching step serves to gelatinize the potato starch and inactivate enzymes.

The potato strips preferably then are dipped in a flume or sprayed with a hot aqueous solution maintained at a temperature of about 150° F. to 170° F. for about 10 to 30 seconds. The aqueous solution contains preferably about 0% to 8% sodium chloride by weight, 0% to 3% dextrose by weight, and about 0% to 1.5% sodium acid pyrophosphate (SAPP) by weight, the latter of which is a chelating agent and color brightener. Other ingredients may be added to the aqueous solution, such as flavorings, starches, spices and/or other seasonings. The addition of starches to the aqueous solution can enhance the texture of the finished product. Coloring agents such as caramel, annatto, turmeric, FDA-approved yellows and reds and blends of these agents optionally may be added to the aqueous solution as well. Caramel, annatto and turmeric are all well-known common natural food colors that have been used to develop color in potatoes and other vegetables for many years. A typical coloring system might include a blend of various common coloring systems including natural or artificial food coloring ingredients (such as 33% caramel and 67% annatto), but easily can be adjusted by common food science technology using various color augmentation techniques to achieve a particular target shade of golden or golden-brown color with a minimum level of deep frying or developed Maillard brown color.

If a flume dip method is used, the strips are conveyed through the solution. If the aqueous solution is applied to the strips by spraying, the strips typically are conveyed past the sprayer. While the percentages of the various ingredients noted above are typical, the percentages may be varied according to the attributes desired in the finished product, and also according to the attributes of the raw potatoes.

Following the aqueous solution treatment, the strips optionally are blanched for a short time in steam to texturize the surface of the strips prior to parfrying. If this surface treatment option is used, the strips may be held in a steam cabinet for about 15 seconds to 4 minutes in an atmosphere of near-saturated steam, at a temperature of about 210° F. to 250° F. Typically, the strips are exposed to steam for about 60 seconds.

Following the aqueous solution treatment and/or steam treatment, the strips preferably are partially dried in air to reduce the surface moisture of the strips. As explained in U.S. Pat. No. 5,753,291, the disclosure of which is incorporated by reference, this drying step conditions the strips after blanching and helps preserve the integrity of the strips. The drying step also helps reduce breakage of the strips.

More specifically, the drying step is selectively controlled so that preferably about 5% to 15% of the weight of the strips is removed as moisture. Most preferably, about 8% to 12% moisture is removed. Because the strips preferably have been immersed in hot water or blanched in steam just prior to the air drying step, the strips are still hot when the drying step begins, thereby facilitating moisture removal. As explained in U.S. Pat. No. 5,753,291, in most instances the drying step involves conveying the strips through a tunnel dryer. The preferred temperature of the dryer is about 100° F. to 250° F. It will be appreciated that the residence time in the dryer is controlled according to temperature and airflow parameters to achieve the optimal, desired weight loss. As such, in most instances the residence time in the tunnel dryer is a function of the temperature of the dryer and amount of airflow through the dryer.

The drying step partially dries the potato strips to reduce water and sugar particles on the surface of the strips that otherwise might be carried into the parfrying vat and cause dullness in the color of the strips. Also, the drying step reduces the surface moisture content of the strips to facilitate the creation of a thinner crispy crust upon subsequent parfrying. The drying step also assists with moisture removal to help achieve the desired solids level for proper finished preparation attributes.

After drying, the strips may be exposed to a relatively short steam treatment to help equilibrate the surface moisture and provide more uniform surface characteristics in the parfried and finish cooked product. Alternatively, the partially dried strips can be held in ambient air for a period of time to allow the surface moisture to equilibrate. If an equilibration step is used, the strips typically are exposed to a steam treatment for about 15 to 30 seconds or ambient air for about 2 to 15 minutes. As explained in U.S. Pat. No. 5,753,291, the equilibration step tends to provide a product having a more consistent surface color and texture.

Next, the strips are parfried in oil for a relatively short period of time to develop a crisp surface and impart flavor to the fried surface. The strips preferably are parfried in high quality food frying oil, such as canola oil, sunflower oil, or hydrosoy oil, for a period of about 15 to 75 seconds, at a temperature of about 250° F. to 400° F., preferably about 340° F. to 380° F.

After parfrying, the excess oil may be removed by blowing high velocity, high temperature hot air, or air/steam mixture, over the product. Typical commercial de-oiling units use hot fryer exhaust stack vapor or heated air to remove the excess oil from the strips.

The de-oiled strips optionally are washed in water, preferably by passing them between a series of top and bottom hot water nozzles to flush off additional surface oil and agitate the strips to enhance de-oiling effectiveness. The strips may be washed in hot water having a temperature of about 130° F. to 200° F. for about 15 to 45 seconds. The water/oil mixture removed and drained from the parfried strips may be flushed away or reclaimed in large settling tanks where the oil and water separates. Other separation technology, such as separators common to the food and dairy industry, may be used as well.

The washed strips may be cooled in air having a temperature of about 35° F. to 90° F., preferably for about 15 to 25 minutes to facilitate cooling and retrograding of the partially cooked potato tissue and starch. If a cooling step is used, the strips preferably are cooled initially by subjecting them to a high velocity stream of cool air at about 250 to 1,500 fpm as the strips are maintained in a shallow bed (about 1 to 2 inches deep) to remove surface water, and then preferably cooled in a deeper bed about 4 to 12 inches deep for the remainder of the cooling period to facilitate retrograding of the potato tissue. The cooling/retrograding step helps to lock in a portion of the internal moisture and facilitate development of an internal moisture target for the finished product. The retrograding step also firms up or toughens internal potato cells so they will tolerate additional cooking (i.e., frying, baking, drying, steaming, etc.) during subsequent processing and final preparation steps, and yet stay moist and resist disintegration or internal hollowing. The strips preferably are not frozen during this step. The air cooling step may be accomplished in a refrigerated cooling tunnel in which the strips are conveyed through the cooling tunnel on a conveyor belt.

The cooled strips subsequently are exposed to superheated steam to cook and dehydrate the surface of the strips, in much the same manner as a parfrying step. The strips preferably are exposed to steam at a temperature of about 300° F. to 500° F., most preferably about 350° F. to 460° F., for about 1¾ to 3½ minutes, most preferably about 2 to 3 minutes. The superheated steam envelops the strips, facilitating the creation of a crisp surface on the strips while extracting moisture. The superheated steam imparts surface crispness in much the same manner as deep frying but without adding additional fat or oil to the potato surface. The superheated steam rapidly cooks and dehydrates the strips to provide a more porous surface that is not as tough and chewy as would be the case with a slower hot air drying or oven cooking treatment step. Notably, as the temperature of the steam drops significantly below 400° F., the finished product starts to lose some crispness, sacrificing some of the benefits of the superheated steam treatment.

In one embodiment, steam generated in a conventional manner and having a temperature of about 265° F. to 275° F. and pressure of about 25 to 30 psig is introduced into a superheating system, where the steam is superheated to about 300° F. to 500° F. and then released into a product superheating chamber through which the strips are conveyed. The pressure of the superheated steam decreases to atmospheric pressure as it enters the product superheating chamber. The steam then is recirculated to the superheating system where it is reheated.

The superheated steam treated strips preferably are further dehydrated in an impingement oven at a temperature of about 400° F. to 500° F. to add surface crispness and increase the solids content of the strips without adding additional oil content. The strips preferably are dehydrated in the impingement oven for about 1 to 4 minutes, depending on cut size, at an airflow rate of about 400 to 2,000 ft/min. The dehydrated strips are optionally cooled, and then frozen and packaged in a conventional manner.

In one alternate embodiment of the process, prior to the parfrying step (preferably just before the parfrying step) the strips are coated with a batter by contacting them with a batter suspension containing, for example, a combination of food starches, food flours, dextrins, salt, sugars, suspending gums, modified food starches, flavors, seasonings, food coloring agents and/or leavening agents. Other known batter formulations or improved formulations may be used as well. With this embodiment, it has been found that the impingement drying step contributes less noticeably to the desirable characteristics of the final product.

In another alternate embodiment of the process, the strips are processed as described above except that the strips are sprayed with oil in a tumble drum or on a conveyor rather than immersed in frying oil and washed in water. More specifically, for example, the cut strips are blanched, optionally dipped in a solution containing coloring agents, SAPP, flavoring and/or salt additives, dried and cooled/retrograded as described above, and then subjected to an oil spray in a tumble drum or conveyor to impart an oil content to the strips. The strips tend to pick up less oil when they are subjected to an oil spray than when they are immersed in oil. The strips preferably are subjected to an oil spray at a temperature of about 60° F. to 250° F. for a time sufficient to pick up preferably about 1% to 6% oil by weight, most preferably about 3 to 6% oil by weight.

Alternatively, the strips may be sprayed with oil at a higher temperature of about 250° F. to 380° F. to create an effect more akin to traditional parfrying. It will be appreciated that the oil spraying step includes a temperature range below what may be considered a "parfrying" temperature. While the temperature at which parfrying occurs is debatable, for purposes of this application, "parfrying" is defined to occur when the strips are contacted with oil, whether they are immersed in an oil bath or otherwise, at a temperature above about 212° F. Thus, the oil spraying step described above contemplates, in one variation, contacting the strips with oil without parfrying.

The oil sprayed strips then are treated with superheated steam, optionally dehydrated in an impingement oven, optionally cooled, and then frozen as described above. In comparison to other embodiments of the present invention, the oil spray process typically will result in frozen potato strips having an even lower oil or fat content than frozen strips deep fried in oil before freezing. Spraying the oil on the strips is an option that allows the processor to more accurately meter the oil amount on the strips, versus deep fat frying, thereby providing a means to more effectively limit the uptake of oil on the surface of the strips. Notably, as the oil content of the strips drops below 2 or 3%, the oil content is desirably lower but the texture of the final product may be tougher in comparison to strips having a higher oil content. At higher oil contents above 6%, the final product has desirable flavor attributes but starts to lose its reduced fat character.

In one modification of the superheated steam step, the strips are conveyed to an impingement oven having a steam filled chamber and a recirculation system in which steam drawn from the chamber is heated to a superheated level (i.e., 400° F. to 450° F.) as it is recirculated and then returned in its superheated state to the chamber. In still another embodiment, the superheated steam and impingement oven steps may be combined into a single step by holding the strips in an impingement dryer-like enclosure, where the strips are exposed to superheated steam, preferably at about 400 to 450° F., for about 2½ to 3 minutes.

In yet another embodiment of the present invention, frozen potato strips can be produced with no fat content by optionally washing potatoes, optionally preheating the potatoes for about 30 to 60 minutes at about 125° F. to 145° F., baking the potatoes at about 250° F. to 350° F. for about 20 to 60 minutes (preferably to a core temperature of about 165° F. to 190° F., most preferably about 180° F.), retrograding the potatoes with cool air at about 40° F. to 70° F. for about 2 to 4 hours to give the potatoes a preferred core temperature of about 40° F. to 70° F. (most preferably about 55° F.), and cutting the potatoes into the desired cut shape. The cut strips are dipped in a color solution as described above, treated with atmospheric steam for about 1 to 5 minutes, preferably for about 2½ to 3 minutes, treated with superheated steam at about 375° F. to 475° F. for about 1 to 3 minutes and frozen. The resulting product has an inconsequential oil content (well less than 1%) and solids content of about 21 to 34%, preferably about 24 to 33%.

In another variation of the no-fat or negligible fat embodiment, whole potatoes preferably are washed and preheated (but not baked) as just described, and then cut into strips. The strips are blanched, contacted with an aqueous solution and dried as described above. The dried strips are cooled in air at about 35° F. to 90° F. and then exposed to superheated steam as described above. Alternatively, the cooled strips may be exposed to superheated steam and then further dehydrated in an impingement oven, also as described above. The strips then are frozen and preferably reconstituted by heating in a convection oven.

The frozen products resulting from the foregoing methods may be reconstituted by finish frying, or oven rethermalization in either conventional ovens, convection ovens, high velocity impingement ovens, or microwave ovens. The final cooking parameters will vary depending upon the cut size of the strips and target properties of the finished product, including oil content. All typical restaurant or home ovens could be used for the final cooking of the product. Fan assisted impingement ovens or convection ovens will cook the strips faster and provide a more consistent golden brown color and crisper surface product. A conventional home thermal oven will cook the product with more variation in color and surface texture and typically require longer cook times. A microwave oven will heat the product up to the desired temperature, producing a color that is a lighter shade of brown and a texture that is more steamed or soft. The strips also may be reconstituted with superheated steam to create a rapid roasting effect or, alternatively, a combination of superheated steam and hot air. For example, the strips may be roasted in superheated steam at a temperature of about 350° F. to 450° F.

The present invention is illustrated by the following examples.

EXAMPLE NO. 1

Russet-Burbank potatoes were cleaned, preheated in water and cut into strips having a cross-sectional dimension of about 0.340 inch by 0.340 inch. The cut strips were blanched for 8 minutes in hot water at 175° F. The strips then were dipped for 30 seconds in a heated aqueous solution containing a blended coloring agent (0.031% by weight of solution), SAPP (0.75% by weight of solution) and salt (3.5% by weight of solution).

The strips were dried in air at 180° F. to effect a weight loss of 10%. The partially dried strips were fried in high oleic canola oil at 375° F. for 15 seconds. The parfried strips were rinsed in hot water at a temperature of 150° F. for 15 seconds and then dried and cooled in ambient air for 20 minutes at 200-600 fpm, causing a moisture loss of 10% to 12%. The dried strips were treated with superheated steam at a temperature of 460° F. for 2 minutes and then dried in an impingement oven for about 2½ minutes at a temperature of 450° F. and airflow rate of 600 to 1400 fpm, and then frozen. The frozen strips had an average solids content of 37.8% by weight, salt content of 1.5% by weight and oil content of 2.56% by weight.

The frozen strips were reconstituted by convection oven baking at a temperature of 400° F. for 4 minutes. The finished product had a solids content of 44.9% by weight, including an oil content of 2.85% and salt content of 1.7% by weight.

The resulting fries were golden brown with a dry crispy surface. The appearance was similar to that of deep fried French fries or higher fat content fries prepared for oven cooking. The interior was reasonably moist and not hollow, with a fried potato flavor. The fries were slightly less crisp than deep fried commercial fries but of good quality relative to low fat, oven baked french fry type potatoes.

EXAMPLE NO. 2

Russet-Burbank potatoes were cleaned and preheated in water for 30 minutes at 130° F., and cut into strips having a cross-sectional dimension of about 0.340 inch by 0.34 inch. The cut strips were blanched in hot water for 8 minutes at 175° F. and then dipped in an aqueous solution containing a color agent (0.031%), SAPP (0.75%) and salt (5.0%). The colored strips were dried in hot air at 180° F. to effect a moisture loss of 10% by weight. The dried strips were parfried for 15 seconds in canola oil at 375° F. The parfried strips were rinsed in hot water at a temperature of 150° F. for 15 seconds. The rinsed strips were blow dried and cooled in ambient air for 20 minutes at 200 to 600 fpm, treated with superheated steam at 460° F. for 3 minutes and then frozen. The frozen strips had an average solids content of 34.6% by weight, salt content of 1.0% by weight and oil content of 2.43% by weight. The frozen strips were reconstituted by convection oven baking for 5½ minutes in air at 400° F. The finished strips had an average solids content of 41.9% by weight, salt content of 1.3% by weight and oil content of 2.29% by weight.

The cooked french fries possessed a dry crisp surface but were less crisp than the fries of Example 1, and exhibited a golden brown color with a fluffy interior and fried potato flavor.

EXAMPLE NO. 3

In this example, Russet-Burbank potatoes were cleaned, preheated in water at 130° F. for 30 minutes and then cut into strips having a cross-sectional dimension of 0.340 inch by 0.340 inch. The cut strips were blanched in water at 160° F. for 6 minutes and then dipped in an aqueous solution containing a color agent, SAPP (0.75%) and salt (5.0%). The colored strips were dried in hot air at 180° F. to effect a 10% moisture loss by weight. The partially dried strips were fried in canola oil at 375° F. for 15 seconds and then subjected to a hot water rinse at 150° F. for 15 seconds. The rinsed strips were blow dried and cooled in ambient air at a flow rate of 200 to 600 fpm for 20 minutes and then treated with atmospheric superheated steam at 460° F. for 2 minutes. The superheated steam treated strips were heated in an impingement oven at 450° F. for 3 minutes and then frozen. The frozen strips had an average solids content of 37.4% by weight, salt content of 1.2% by weight and oil content of 2.06% by weight.

The frozen strips were reconstituted by cooking in an oven for 5 minutes at 400° F. The finished fries had an average solids content of 51.6% by weight, including 1.1% salt and 3.65% oil.

The finished fries had a pleasing fresh fry appearance, fried potato flavor, moist interior, and slightly chewy texture with more crispness than the fries of Example 1.

EXAMPLE NO. 4

In this example, Russet-Burbank potatoes were cleaned, preheated in hot water at 130° F. for 30 minutes and cut into strips having a cross-sectional dimension of 0.340 inch by 0.340 inch. The cut strips were blanched in hot water at 175° F. for 8 minutes and then dipped in an aqueous solution containing a color agent. The colored strips were dried in hot air at 180° F. to effect a moisture loss of 10% by weight. The partially dried strips were dipped in a batter solution (clear coating of food starches), fried in canola oil at 375° F. for 20 seconds, and then subjected to a hot water rinse at 150° F. for 15 seconds. The rinsed strips were blow dried and cooled for 20 minutes in ambient air (10% to 12% weight loss) and then treated with superheated steam at 460° F. for 2 minutes, and then frozen. The frozen strips had an average solids content of 34.8%, including 1.0% salt and 3.73% oil by weight.

The frozen strips were reconstituted by convection oven heating at 400° F. for 7 minutes. The finished fries had an average solids content of 49.5% by weight, including 1.4% salt and 5.33% oils. The finished product had a crisp and tender bite. It held crispness and became tender after a brief holding period after cooking. The coated surface was smooth in appearance.

EXAMPLE NO. 5

In this example, Russet-Burbank potatoes were cleaned, preheated in water at 130° F. for 30 minutes and then cut into strips having a cross-sectional dimension of 0.340 inch× 0.340 inch. The cut strips were blanched in hot water at 175° F. for 8 minutes and dipped in a hot aqueous solution containing a color agent. The colored strips were dried in hot air at 180° F. to effect a 10% weight loss by weight. The partially dried strips were dipped in a batter suspension containing a clear coating batter including but not limited to food starches, food flours, dextrins, salt, sugars, food coloring agents and then parfried in canola oil at 375° F. for 20 seconds. The parfried strips were rinsed in hot water at 150° F. for 15 seconds and then treated with superheated steam at 460° F. for 3 minutes, and frozen. The frozen strips had an average solids content of 37.6%, including 0.8% salt and 3.6% oil by weight.

The frozen strips were reconstituted by heating in a convection oven at 400° F. for 7 minutes. The finished fries had an average solids content of 53.3% by weight, including 1.0% salt and 5.05% oils. The finished product possessed a crisp surface with good potato flavor. The coated surface was smooth and uniform, with a texture and appearance comparable to traditional commercial fries. The surface tenderness was slightly thick at first but improved after a brief hold time after cooking, much like traditional coated fries.

EXAMPLE NO. 6

In this example, Russet-Burbank potatoes were cleaned and preheated in hot water at 130° F. for 30 minutes, and cut into strips having a cross-sectional dimension of 0.340 inch by 0.340 inch. The cut strips were blanched in hot water at 160° F. for 6 minutes and then dipped in a hot aqueous solution containing 3.25% salt, 0.75% SAPP, and 0.175% color solution including a 75/25 blend of annatto and caramel. The colored strips were dried in hot air at 180° F. to effect a 10% moisture loss by weight. The partially dried strips were blow dried in ambient air for 20 minutes and then sprayed with canola oil in a tumbling drum for 20 seconds at 70° F. The strips picked up about 3% oil by weight. The sprayed strips were treated with superheated steam at 460° F., for 2 minutes and then heated in an impingement oven for 2½ minutes with air jets circulating air at 450° F. The strips were then frozen. The frozen strips had an average solids content of 40.7% by weight, including 0.9% salt and 2.8% oil. The frozen strips were reconstituted by convection oven heating at a temperature of 400° F. for 5 minutes. The reconstituted fries had an average solids content of 42.0% by weight, including 1.5% salt and 2.8% oil. The oven baked product possessed a moist interior with a dry surface. The surface had some crispness but was more chewy than a parfried, water washed product.

EXAMPLE NO. 7

In this example, Russet-Burbank potatoes were cleaned (not peeled), preheated in hot water for 60 minutes at 145° F., and then baked in a convection oven at 300° F. for a time sufficient to raise the core temperature of the potatoes to about 180° F. Next, the potatoes were cooled at a temperature of 40° F. for two to four hours and cut into a wedge shape ("10 cut") having the following dimensions: 2 by 4 inches long and 0.5 to 0.75 inches wide on the outer peel on the surface of the wedge, tapering to the center of the potato. The wedge strips were treated with steam at atmospheric pressure for 2½ minutes and then dipped in a solution containing a color additive, SAPP (0.5%) and salt (7.0%). The strips thereafter were treated with superheated steam at 460° F. for 75 seconds and frozen. The frozen strips had an average solids content of 25.76% by weight, including an average oil content of 0.14% and salt content of 0.60%. The frozen strips were reconstituted by heating in a convection oven at 450° F. for 7 minutes. The finished baked product exhibited a light golden color, and flavor similar to a moist wedge of baked potato without condiments. The flavor was characteristic of a cooked potato, but relatively bland without a sauce, dressing or dip.

EXAMPLE 8

In this example, Russet-Burbank potatoes were cleaned (not peeled), preheated in hot water for 45 minutes at 145° F., and then baked in a convection oven at 300° F. for a time sufficient to raise the core temperature of the potatoes to about 180° F. Next, the potatoes were cooled in air at a temperature of 40° F. for a time sufficient (about two hours) to achieve a core temperature of about 55° F., and cut into large strips with a GRL 9/16 inch slab×½ inch cross cut reel. The regular straight cut strips were dipped in a solution containing a color additive, SAPP (0.5%) and salt (3.5%) and then treated with steam at atmospheric pressure for 1 minute. The strips thereafter were treated with superheated steam at 460° F. for 2½ minutes and then frozen. The frozen strips had an average solids content of 26.83% by weight, including a negligible oil content of 0.07% and salt content of 0.50%. The frozen strips were reconstituted by heating in a convection oven at 450° F. for 6 minutes. The finished product exhibited a thicker outer shell in comparison to Example 7. The finished product was golden yellow in color with a moist baked potato interior texture. The surface was slightly chewy. The flavor was comparable to a strip cut from a whole baked potato. The interior was moist.

EXAMPLE 9

In this example, Russet-Burbank potatoes were cleaned (not peeled), preheated in hot water for 45 minutes at 145° F., and then blanched whole in water at 185° F. for a time sufficient to raise the core temperature of the potatoes to about 180° F. Next, the potatoes were cooled for two to four hours with air at 40° F. to achieve a core temperature of about 55° F., and cut into ½ inch regular straight cut strips having the following dimensions: 9/16 by ½ inch. The regular straight cut strips were dipped in a solution containing a color additive, SAPP (0.5%) and salt (5.0%) and then treated with steam at atmospheric pressure for 1 minute. The strips thereafter were treated with superheated steam at 460° F. for 2½ minutes and then frozen. The frozen strips had an average solids content of 25.94% by weight, including a negligible oil content and salt content of 1%. The frozen strips were reconstituted by heating in a convection oven at 450° F. for 7 minutes. The finished product exhibited a slightly drier interior in comparison to Examples 7 and 8. The finished product was similar to those in Examples 7 and 8.

EXAMPLE 10

In this example, Russet-Burbank potatoes were cleaned, preheated in hot water for 30 minutes at 130° F., and cut into straight cut strips having a cross-section of 0.340 by 0.340 inch. The cut strips were blanched for 8 minutes at 175° F. and then dipped in a solution containing a color additive and SAPP (0.75%) for 15 seconds at 160° F. to 170° F. The strips then were dried in hot air at 180° F. for a time sufficient to cause a 10% weight loss, and then blow dried for 20 minutes in ambient air. The strips thereafter were treated with superheated steam at 460° F. for 2 minutes, then heated in an impingement oven for 2½ minutes at 450° F., and frozen. The frozen strips had an average solids content of 39.68%.

The strips were reconstituted by heating in a convection oven at 400° F. for 5 minutes. The resulting potato strips had an average solids content of 46.76%, by weight. The finished strips had a slightly drier interior and chewier surface texture than the strips of Example 9.

EXAMPLE 11

In this example, Russet-Burbank potatoes are cleaned and preheated in hot water at 130° F. for 30 minutes, and cut into strips having a cross-sectional dimension of 0.340 inch by 0.340 inch. The cut strips are blanched in hot water at 160° F. for 6 minutes and then dipped in a hot aqueous solution containing 3.25% salt, 0.75% SAPP, and 0.175% color solution including a 75/25 blend of annatto and caramel. The colored strips are dried in hot air at 180° F. to effect a 10% moisture loss by weight. The partially dried strips are blow dried in ambient air for 20 minutes and then are sprayed with canola oil in a tumbling drum for 20 seconds at 250° F. to 380° F. The strips pick up about 3% oil by weight. The sprayed strips are treated with superheated steam at 460° F. for 2 minutes and then heated in an impingement oven for 2½ minutes with air jets circulating air at 450° F. The strips are then frozen. The frozen strips have an average solids content of about 42-47% by weight, including 0.5 to 1.5% salt and about 2 to 4% oil. The frozen strips are reconstituted by convection oven heating at a temperature of 400° F. for 5 minutes. The reconstituted fries have an average solids content of 44.0% to 49.0% by weight, including 1.5% salt and 2 to 4% oil. The oven baked product possesses a moist interior with a dry surface. The surface has some crispness but is more chewy than a parfried, water washed product.

It will be appreciated from Examples 1 to 6 that the finished product had an average oil content significantly less than the level typically found in regular french fried potato products (about 7 to 12%). With some no-fat products (see Examples 7-9), it is advantageous to preheat and bake the potatoes with the skin on to retain a higher level of internal moisture in the potatoes.

Having illustrated and described the principles involved in this invention, it should be apparent to those persons skilled in the art that such embodiments as described may be modified in arrangement and detail without departing from the principles described. We claim as our invention all such modifications as come within the true spirit and scope of the invention and as defined by the following claims:

I claim:

1. A method of preparing potato strips comprising:
cutting whole potatoes into strips;
blanching the strips a first time;
applying to the strips a solution including one or more coloring agents;
drying the strips;
parfrying the strips in oil;
rinsing the strips with water;
cooling the strips;
exposing the strips to superheated steam to reduce the moisture content of the strips; and
freezing the strips.

2. The method of claim 1 wherein the strips are blanched a first time in steam.

3. The method of claim 1 wherein the solution includes salt and SAPP.

4. The method of claim 1 wherein the strips, after applying, are blanched a second time in steam.

5. The method of claim 4 wherein the strips are blanched a second time in steam having a temperature of about 210° F. to 250° F. for about 15 seconds to 4 minutes.

6. The method of claim 1 wherein the strips are dried to cause a weight loss of about 5% to 15% by weight.

7. The method of claim 6 wherein the strips are dried at a temperature of about 100° F. to 250° F.

8. The method of claim 1 wherein the strips, after drying and before parfrying, are allowed to equilibrate.

9. The method of claim 8 wherein the strips are equilibrated by treating them with steam for about 15 to 30 seconds.

10. The method of claim 8 wherein the strips are equilibrated by exposing them to ambient air for about 2 to 15 minutes.

11. The method of claim 1 wherein prior to parfrying a batter coating is applied to the strips.

12. The method of claim 11 wherein the batter coating includes at least one additive from a group comprising food starch, food flour, food coloring agent, and salt.

13. The method of claim 1 wherein the strips are parfried by immersing the strips in a bath of oil at a temperature of about 250° F. to 400° F.

14. The method of claim 1 wherein the strips are parfried by spraying the strips with oil.

15. The method of claim 14 wherein the strips are sprayed with oil at a temperature of about 212° F. to 250° F. to cause the strips to pick up an oil content of about 1 to 6% by weight.

16. The method of claim 1 wherein the strips, after parfrying, are rinsed in hot water at a temperature of about 130° F. to 200° F. for about 15 to 45 seconds.

17. The method of claim 1 wherein the strips, after parfrying, are cooled.

18. The method of claim 17 wherein the strips are cooled in ambient air.

19. The method of claim 17 wherein the strips are cooled in air at a temperature of about 35° F. to 90° F. for about 15 to 25 minutes.

20. The method of claim 17 wherein the strips are cooled by blowing air at a temperature of about 35° F. to 90° F. through the strips.

21. The method of claim 1 wherein the strips, after parfrying and before freezing, are exposed to superheated steam having a temperature of about 300° F. to 500° F.

22. The method of claim 1 wherein the strips, after cooling and before freezing, are exposed to superheated steam at a temperature of about 300° F. to 500° F.

23. The method of claim 1 wherein following exposing to superheated steam, the strips are dried in an impingement oven.

24. The method of claim 23 wherein the strips are dried in an impingement oven at a temperature of about 4000° F. to 500° F. for about 1 to 4 minutes.

25. The method of claim 1 wherein the frozen strips are reconstituted by heating the frozen strips in superheated steam.

26. The method of claim 1 wherein the frozen strips are reconstituted by heating the frozen strips in superheated steam and hot air.

27. A method of preparing potato strips comprising:
cutting whole potatoes into strips having a desired size and shape;
blanching the strips a first time;
applying to the strips a solution including one or more coloring agents;
drying the strips in air at a temperature and for a period of time sufficient to cause a loss of moisture of about 5 to 15% by weight;
parfrying the strips with oil to add an oil content to the strips;
rinsing the strips with water;
cooling the strips in a flow of moving air;
exposing the strips to superheated steam;
drying the strips in an impingement oven; and
freezing the strips.

28. The method of claim 27 including treating the strips with steam after drying and before parfrying.

29. The method of claim 27 wherein the treating step includes allowing the strips to equilibrate in ambient air for about 2 to 15 minutes.

30. The method of claim 27 wherein, prior to parfrying, a batter coating is applied to the strips.

31. The method of claim 27 wherein the parfrying step includes spraying the strips with oil.

32. The method of claim 27 wherein the strips are exposed to superheated steam at a temperature of about 300° F. to 500° F.

33. The method of claim 27 wherein the strips are dried in an impingement oven by a flow of air at a temperature of about 400° F. to 500° F. for about 1 to 4 minutes.

34. A method of preparing potato strips comprising:
baking whole potatoes at about 250° F. to 350° F. to a core temperature of about 165° F. to 190° F.;
cooling the potatoes in cool air for about 2 to 4 hours;
cutting the potatoes into strips;
applying a coloring solution to the strips;
treating the strips with steam for about 1 to 5 minutes;
treating the strips with superheated steam for about 1 to 3 minutes; and
freezing the strips.

* * * * *

UNITED STATES PATENT AND TRADEMARK OFFICE
CERTIFICATE OF CORRECTION

PATENT NO. : 7,560,128 B2
APPLICATION NO. : 11/053031
DATED : July 14, 2009
INVENTOR(S) : Jerry L. Sloan It is certified that error appears in the above-identified patent and that said Letters Patent is hereby corrected as shown below:

In the Claims:

Claim 22, column 13, line 17, "claim 1wherein" should read --claim 1 wherein--.

Claim 24, column 13, line 24, "4000° F." should read --400° F.--.

Signed and Sealed this

Fifteenth Day of June, 2010

David J. Kappos
*Director of the United States Patent and Trademark Office*